United States Patent [19]

Reiter et al.

[11] Patent Number: 5,666,526

[45] Date of Patent: Sep. 9, 1997

[54] METHOD AND SYSTEM FOR SUPPORTING SCROLLABLE, UPDATABLE DATABASE QUERIES

[75] Inventors: Allen Reiter, Haifa, Israel; Stephen Charles Hecht; Matthew Bellew, both of Seattle, Wash.; Stephen Albert Brandli, Bothell; Adam Bosworth, Mercer Island, both of Wash.

[73] Assignee: Microsoft Corp., Redmond, Wash.

[21] Appl. No.: 649,910

[22] Filed: May 16, 1996

Related U.S. Application Data

[63] Continuation of Ser. No. 116,258, Sep. 2, 1993, abandoned.

[51] Int. Cl.$^6$ .................................................. G06F 17/30
[52] U.S. Cl. .................................................. 395/602
[58] Field of Search .................................... 395/600, 602

[56] References Cited

U.S. PATENT DOCUMENTS

| 4,817,036 | 3/1989 | Millett et al. | 364/900 |
|---|---|---|---|
| 5,093,782 | 3/1992 | Muraski et al. | 395/600 |
| 5,097,408 | 3/1992 | Huber | 395/600 |
| 5,241,648 | 8/1993 | Cheng et al. | 395/600 |
| 5,253,361 | 10/1993 | Thurman et al. | 395/600 |
| 5,276,870 | 1/1994 | Shan et al. | 395/600 |
| 5,293,616 | 3/1994 | Flint | 395/600 |
| 5,388,255 | 2/1995 | Pytlik et al. | 395/600 |
| 5,594,899 | 1/1997 | Knudsen et al. | 395/602 |

FOREIGN PATENT DOCUMENTS

| 0 314 279 | 5/1989 | European Pat. Off. . |
| WO 92/16903 | 10/1992 | WIPO . |

OTHER PUBLICATIONS

*Quest User's Guide*, Gupta Technologies, Inc., 1990, pp. xii–xiii, and 30.

Primary Examiner—Wayne Amsbury
Attorney, Agent, or Firm—Seed and Berry LLP

[57] ABSTRACT

A method and system for supporting scrollable, updatable database queries is provided. In a preferred embodiment, a database engine receives a query request specifying the retrieval of data from a source table stored by the engine. The engine then generates a query table that contains references to rows of a source table that satisfy the query request. The engine then receives one or more retrieve requests requesting that data specified by the query be provided by the engine. For each retrieval request, the engine retrieves data from the source table using one or more references from the query table.

45 Claims, 16 Drawing Sheets

|     | Name / 131 | Title / 132 | Manager / 133 | Compensation Type / 134 |
|---|---|---|---|---|
| 101 | Andrea | Tester | Rose | salary |
| 102 | Ben | Tester | Rose | salary |
| 103 | Bruce | Assembler | Melba | wage |
| 104 | Ceilia | Ad Buyer | Penny | salary |
| 105 | Cindy | Draftsperson | Manelio | salary |
| 106 | Eunice | Tester | Rose | salary |
| 107 | Gene | Planner | Manelio | salary |
| 108 | Harvey | Ad Buyer | Penny | salary |
| 109 | Isaac | Assembler | Sid | wage |
| 110 | Jeremy | Metalworker | Gus | salary |
| 111 | Jill | Assembler | Melba | salary |
| 112 | Joe | Metalworker | Gus | salary |
| 113 | Judith-Ann | Detail Designer | Rich | salary |
| 114 | Louise | Ad Writer | Phillip | salary |
| 115 | Maria | High-Level Designer | Rich | salary |
| 116 | Marsha | Assembler | Melba | wage |
| 117 | Melvin | Ad Writer | Phillip | salary |
| 118 | Merrill | Assembler | Melba | wage |
| 119 | Rolf | High-Legel Designer | Rich | salary |
| 120 | Sandra | Sr. Tester | Julia | salary |
| 121 | Selma | High-Level Designer | Manelio | salary |
| 122 | Stan | Ad Writer | Phillip | salary |
| 123 | Sung | Detail Designer | Rich | salary |
| 124 | Ted | Ad Buyer | Penny | salary |
| 125 | Terry | Assembler | Sid | wage |
| 126 | William | Assembler | Gus | wage |
| 127 | Zoe | Metalworker | Sid | salary |

EmployeesTable

*FIG. 1A*

| Manager | Department Number |
|---|---|
| Gus | 2 |
| Julia | 3 |
| Manelio | 1 |
| Melba | 2 |
| Penny | 4 |
| Phillip | 4 |
| Rich | 1 |
| Rose | 3 |
| Sid | 2 |

ManagersTable

*FIG. 1B*

|     | Name | Manager | Department Number |
|-----|------|---------|-------------------|
| 201 | Andrea | Rose | 3 |
| 202 | Ben | Rose | 3 |
| 204 | Ceilia | Penny | 4 |
| 205 | Cindy | Manelio | 1 |
| 206 | Eunice | Rose | 3 |
| 207 | Gene | Manelio | 1 |
| 208 | Harvey | Penny | 4 |
| 210 | Jeremy | Gus | 2 |
| 211 | Jill | Melba | 2 |
| 212 | Joe | Gus | 2 |
| 213 | Judith-Ann | Rich | 1 |
| 214 | Louise | Phillip | 4 |
| 215 | Marla | Rich | 1 |
| 217 | Melvin | Phillip | 4 |
| 219 | Rolf | Rich | 1 |
| 220 | Sandra | Julia | 3 |
| 221 | Selma | Manelio | 1 |
| 222 | Stan | Phillip | 4 |
| 223 | Sung | Rich | 1 |
| 224 | Ted | Penny | 4 |
| 227 | Zoe | Sid | 2 |

QueryTable

FIG. 2

| Output Column Name | Output Column Derivation |
|---|---|
| Name | Employees.Name |
| Manager | Employees.Manager |
| DepartmentNumber | Managers.DepartmentNumber |

*FIG. 13*

| | Employees Bookmark (1431) | Managers Bookmark (1432) | Employees Alteration Indicator (1433) | Managers alteration Indicator (1434) |
|---|---|---|---|---|
| 1401 | Name = "Andrea" | Manager = "Rose" | 22-Aug-89 16:08.33 | 26-Aug-89 17:03.35 |
| 1402 | Name = "Ben" | Manager = "Rose" | 22-Aug-89 16:11.22 | 26-Aug-89 17:03.57 |
| 1404 | Name = "Ceilia" | Manager = "Penny" | 22-Aug-89 16:11.97 | 26-Aug-89 17:03.82 |
| 1405 | Name = "Cindy" | Manager = "Manelio" | 22-Aug-89 16:12.57 | 26-Aug-89 17:04.24 |
| 1406 | Name = "Eunice" | Manager = "Rose" | 22-Aug-89 17:02.96 | 26-Aug-89 17:04.45 |
| 1407 | Name = "Gene" | Manager = "Manelio" | 22-Aug-89 17:03.14 | 26-Aug-89 17:04.72 |
| 1408 | Name = "Harvey" | Manager = "Penny" | 22-Aug-89 17:03.35 | 26-Aug-89 17:05.04 |
| 1410 | Name = "Jeremy" | Manager = "Gus" | 22-Aug-89 17:03.57 | 26-Aug-89 17:05.16 |
| 1411 | Name = "Jill" | Manager = "Melba" | 22-Aug-89 17:03.82 | 26-Aug-89 17:05.31 |
| 1412 | Name = "Joe" | Manager = "Gus" | 22-Aug-89 17:04.24 | 26-Aug-89 17:05.49 |
| 1413 | Name = "Judith-Ann" | Manager = "Rich" | 22-Aug-89 17:04.45 | 27-Aug-89 08:52.21 |
| 1414 | Name = "Louise" | Manager = "Phillip" | 22-Aug-89 17:04.72 | 27-Aug-89 08:53.00 |
| 1415 | Name = "Marla" | Manager = "Rich" | 22-Aug-89 17:05.04 | 27-Aug-89 08:55.22 |
| 1417 | Name = "Melvin" | Manager = "Phillip" | 22-Aug-89 17:05.16 | 27-Aug-89 09:12.21 |
| 1419 | Name = "Rolf" | Manager = "Rich" | 22-Aug-89 17:05.31 | 27-Aug-89 09:12.79 |
| 1420 | Name = "Sandra" | Manager = "Julia" | 22-Aug-89 17:05.49 | 27-Aug-89 09:52.21 |
| 1421 | Name = "Selma" | Manager = "Manelio" | 25-Aug-89 8:52.21 | 27-Aug-89 09:53.00 |
| 1422 | Name = "Stan" | Manager = "Phillip" | 25-Aug-89 08:53.00 | 27-Aug-89 09:55.22 |
| 1423 | Name = "Sung" | Manager = "Rich" | 25-Aug-89 08:55.22 | 27-Aug-89 10:12.21 |
| 1424 | Name = "Ted" | Manage = "Penny" | 25-Aug-89 09:12.21 | 27-Aug-89 10:12.79 |
| 1427 | Name = "Zoe" | Manager = "Sid" | 25-Aug-89 09:12.79 | 27-Aug-89 10:12.99 |

*FIG. 14A*

| Employees Bookmark | Managers Bookmark | Employees Alteration Indicator | Managers alteration Indicator |
|---|---|---|---|
| Name = "Andrea" | Manager = "Sid" | 22-Aug-89 16:08.33 | 26-Aug-89 17:03.35 |
| Name = "Ben" | Manager = "Rose" | 22-Aug-89 16:11.22 | 26-Aug-89 17:03.57 |
| Name = "Ceilia" | Manager = "Penny" | 22-Aug-89 16:11.97 | 26-Aug-89 17:03.82 |
| Name = "Cindy" | Manager = "Manelio" | 22-Aug-89 16:12.57 | 26-Aug-89 17:04.24 |
| Name = "Eunice" | Manager = "Rose" | 22-Aug-89 17:02.96 | 26-Aug-89 17:04.45 |
| Name = "Gene" | Manager = "Manelio" | 22-Aug-89 17:03.14 | 26-Aug-89 17:04.72 |
| Name = "Harvey" | Manager = "Penny" | 22-Aug-89 17:03.35 | 26-Aug-89 17:05.04 |
| Name = "Jeremy" | Manager = "Gus" | 22-Aug-89 17:03.57 | 26-Aug-89 17:05.16 |
| Name = "Jill" | Manager = "Melba" | 22-Aug-89 17:03.82 | 26-Aug-89 17:05.31 |
| Name = "Joe" | Manager = "Gus" | 22-Aug-89 17:04.24 | 26-Aug-89 17:05.49 |
| Name = "Judith-Ann" | Manager = "Rich" | 22-Aug-89 17:04.45 | 27-Aug-89 08:52.21 |
| Name = "Louise" | Manager = "Phillip" | 22-Aug-89 17:04.72 | 27-Aug-89 08:53.00 |
| Name = "Marla" | Manager = "Rich" | 22-Aug-89 17:05.04 | 27-Aug-89 08:55.22 |
| Name = "Melvin" | Manager = "Phillip" | 22-Aug-89 17:05.16 | 27-Aug-89 09:12.21 |
| Name = "Rolf" | Manager = "Rich" | 22-Aug-89 17:05.31 | 27-Aug-89 09:12.79 |
| Name = "Sandra" | Manager = "Julia" | 22-Aug-89 17:05.49 | 27-Aug-89 09:52.21 |
| Name = "Selma" | Manager = "Manelio" | 25-Aug-89 8:52.21 | 27-Aug-89 09:53.00 |
| Name = "Stan" | Manager = "Phillip" | 25-Aug-89 08:53.00 | 27-Aug-89 09:55.22 |
| Name = "Sung" | Manager = "Rich" | 25-Aug-89 08:55.22 | 27-Aug-89 10:12.21 |
| Name = "Ted" | Manage = "Penny" | 25-Aug-89 09:12.21 | 27-Aug-89 10:12.79 |
| Name = "Zoe" | Manager = "Sid" | 25-Aug-89 09:12.79 | 27-Aug-89 10:12.99 |

*FIG. 14B*

METHOD AND SYSTEM FOR SUPPORTING SCROLLABLE, UPDATABLE DATABASE QUERIES

CROSS-REFERENCE TO RELATED APPLICATION

This application is a Continuation under 37 C.F.R. §1.60 of U.S. patent application No. 08/116,258, filed Sep. 2, 1993, now abandoned.

TECHNICAL FIELD

The invention relates generally to a method and system for querying a database, and, more specifically, to a method and system for supporting scrollable, updatable database queries.

BACKGROUND OF THE INVENTION

A database engine (engine) is a computer program for storing and retrieving data. Such data is often limited to text (letters, numerals, symbols, and other characters), but may include any data that may be stored by a computer. Most engines store data in tables. A table is a series of rows, also called records. Each row contains data about a particular thing, such as an employee. The rows are divided into columns. The intersection of a row and column is referred to as a field. Each column specifies a particular type of data that is contained in each field of the column. Each field contains the data of the particular type for the intersecting row and column. Example columns for an Employees table include Name, Title, Manager, and CompensationType. A row of such a table would contain the name, title, manager, and compensation type for a particular employee, each in a separate field. Any column (or group of columns) may be designated as a unique index column. The engine ensures that unique index columns remain unique by not permitting any rows to be added to a table where the new row's unique index field duplicates the unique index field of an existing row.

Figure 1B:
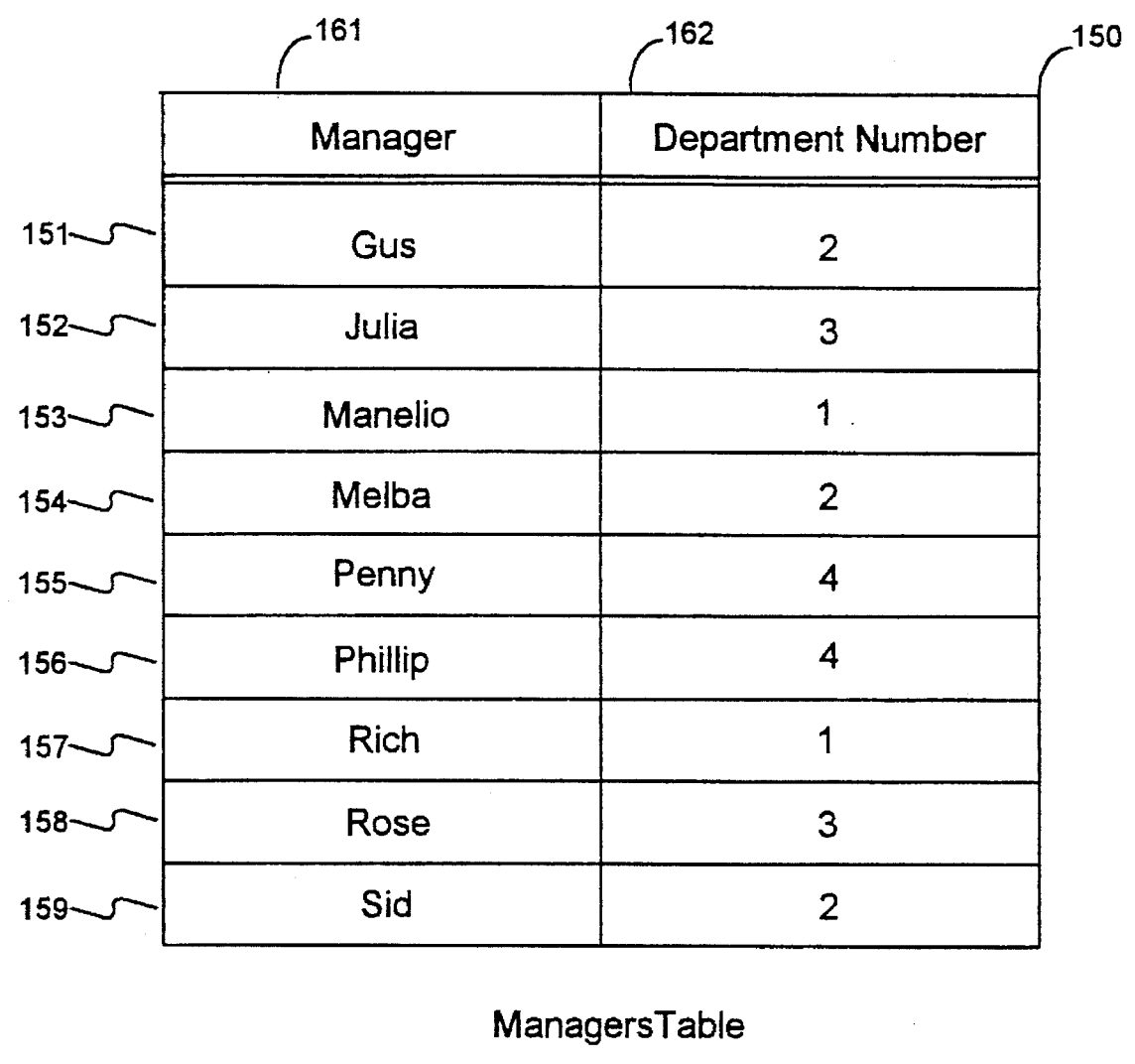

FIG. 1A is a table diagram showing the contents of a sample table named Employees. The Employees table 100 contains 27 rows 101–127. Each row contains a field for each of four columns: a Name column 131, a Title column 132, a Manager column 133, and a CompensationType column 134. For instance, row 101 has a Name field that contains "Andrea", a Title field that contains "Tester", a Manager field that contains "Rose", and a CompensationType field that contains "salary". The Name column is a unique index column of the Employee's Table.

An engine may be used directly by a person or by a database front-end program. Such persons and database front-end programs will be referred to hereafter collectively as users of the engine. An engine typically receives instructions to retrieve data stored in tables, called queries, from a user. Queries are usually expressed in one of several common query languages, such as Structured Query Language (SQL).

A query specifies the data to be retrieved and the manipulations to be made to the retrieved data. A query therefore specifies the table or tables from which data is to be retrieved (the source tables), selection criteria for the rows to be retrieved, the definition of derived fields, and other related information. A derived field is a field that contains data that is derived from one or more other fields.

In response to a query, a conventional (typical) engine performs data retrieval and manipulation specified by the query. In doing so, the conventional engine generates a conventional query table to hold the query result. The conventional query table contains a "static" view of the query result. A user may access query result by invoking primitive operations (primitives) defined by the conventional engine. The conventional engine may provide primitives to browse through the query result, that is, step through the rows of the conventional query table and retrieve data that the conventional engine stored in the fields while processing the query. By invoking these primitives, the user can retrieve the results of the query.

As an example of a query, the user could construct and submit a query to select the salaried employees from the Employees table, then use a Managers table to determine each employee's department number based on the name of the employee's manager. FIG. 1B is a table diagram showing the contents of the Managers table. The Managers table 150 contains 9 rows 151–159. Each row contains a field for each of two columns: a Manager column 161 and a DepartmentNumber column 162. The Manager column is a unique index column of the Manager's table. If expressed in SQL, the query would appear as follows:

1 SELECT Employees.Name, Employees.Manager,
2 Managers.DepartmentNumber
3 FROM Employees, Managers Employees INNER JOIN Managers
4 ON Employees.Manager=Managers.Manager
5 WHERE Employees.CompensationType="salary";

TABLE 1

Line 5 of the query tells the engine to select the rows of the Employees table whose the CompensationType fields contain "salary". Line 3 tells the engine to join the selected rows of the Employees table with the Managers table. Line 4 tells the engine that a row of the Employees table should be joined to a row of the Managers table if the Manager field of the Employee table equals the Manager field of the Managers table. Lines 1–2 tell the engine that the query table should contain the following columns of the joined rows: Name, Manager, and DepartmentNumber.

FIG. 2 is a table diagram showing the contents of the conventional query table created by the conventional engine in response to the query shown in Table 1. Query table 200 has 22 rows corresponding to the rows of the Employees table with a compensation type field of "salary." Rows corresponding to rows 103, 109, 116, 118, 125, and 126 of the Employees table do not appear because they do not have "salary" in the CompensationType column. The query table 200 has three columns: a Name column 231, a Manager column 232, and a DepartmentNumber column 233. The data in the Name and Manager columns has been copied from the Employees table. For example, row 201 contains a copy of the contents of fields in row 101. Specifically, it contains an Employee field containing "Andrea" and a Manager field containing "Rose." Similarly, the data in the DepartmentNumber column has been copied from the Managers table. For example, row 201 contains a copy of the contents of fields in row 158. Specifically, it contains a DepartmentNumber field containing "3".

Because a conventional (typical) engine copies data from the source tables into a conventional query table, a conventional query table contains only actual data, and therefore is classified as a base table. As a base table, the conventional query table is not associated with any other tables. In particular, once the conventional query table is generated it is dissociated from its source tables. This disassociation is a disadvantage, as subsequent changes to the data in the source tables are not reflected in the query result. Further, the user is not able to change the data in the source tables by changing the data in the query result. Also, when the user changes the data in a field of the query result, data in other fields of the query result cannot be automatically updated. For example, if a user changes the manager for "Adrea" from "Rose" to "Penny" the Department Number field is not automatically updated from "3" to "4" to reflect the new department.

Other conventional engines process a query by continuously executing it against the source tables, that is, dynamically generating the rows of the query result. In this continuous execution method, no query table is actually generated. Instead, each time the user uses primitives to move within the query result to retrieve a row, the engine moves through the source tables executing the query. For example, if the current row in the query result is row 224, the current row in the source table is row 124. If the user uses primitives to move to the next row of the query result and retrieve its fields, the method moves to row 125 of the source table. The engine determines that row 125 does not satisfy the query and then moves to row 126. Row 126 also does not satisfy the query, so the engine moves to row 127. Because row 127 of the source table satisfies the query, the engine returns the fields of row 127 in response to the primitive. This method permits the user to retrieve current data from the source table, and also permits the user to update fields of the source table by updating the query result.

The continuous execution method has several disadvantages, however. First, since query execution is very expensive in processing time, the method is very processing-intensive for complex queries. Instead of minimizing query execution, the engine continues to execute the query over and over as the user interacts with the query result. Further, the method limits navigation in the query result to sequential access, as the method can only move incrementally forward or backward in the source table. As a result, the method generally cannot be used when the result is sorted. Finally, an engine using the method has no information about the number of rows in the query result or about the relative position of the current row of the query result within the entire query result, both of which are necessary for providing smooth support for user interface positioning features such as scroll bars.

SUMMARY OF THE INVENTION

In a preferred embodiment, a database engine receives a query request specifying the retrieval of data from a source table stored by the engine. The engine then generates a reference virtual query table that contains references to rows of a source table that satisfy the query and through which the query results are generated. The engine then receives one or more retrieve requests requesting that data specified by the query be provided by the engine. For each retrieval request, the engine retrieves data from the source table using one or more references from the reference virtual query table. The results of the query are updatable. That is, a change to a query result is reflected in the underlying source tables. Moreover, if a joined-to field is changed, the fields oft he query result are automatically updated (row fix up). Also, if the source of a derived field is updated, then the derived field is automatically updated.

BRIEF DESCRIPTION OF THE DRAWINGS

FIG. 1A is a table diagram showing the contents of a sample base table named Employees.

FIG. 1B is a table diagram showing the contents of the Managers table.

FIG. 2 is a table diagram showing the contents of the conventional query table created by the engine in response to the query shown in Table 1.

FIG. 13 is a diagram of the output column derivation for this query.

FIG. 14A is a table diagram of the RVQT produced by the engine.

FIG. 14B is a table diagram of the RVQT after the SetField API is called.

DETAILED DESCRIPTION OF THE INVENTION

A method and system for supporting scrollable, updatable database queries is provided. In a preferred embodiment, a referenced virtual query table database engine (the engine) generates referenced virtual query tables (RVQTs) in response to query instructions. An RVQT is a "virtual" table that contains references to data within source tables. Specifically, the fields of an RVQT contain references, called bookmarks, that each uniquely identify a particular row of a particular source table, rather than a base table containing actual data copied from source tables. Each row of the RVQT corresponds to a row of the query result. The engine responds to user requests to access the query result by using the RVQT to dynamically generate data for the query result from the source tables.

Figure 3:
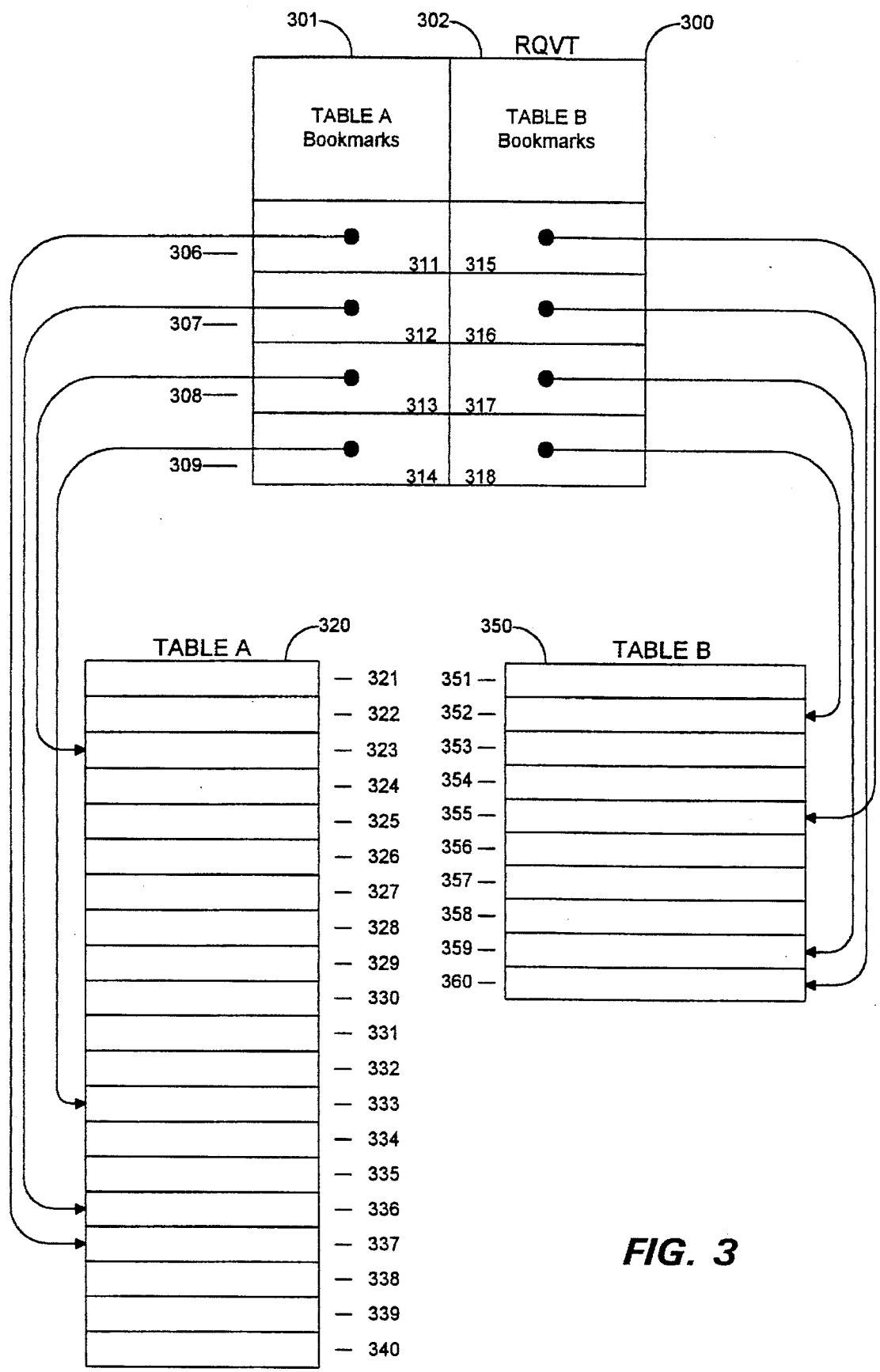
FIG. 3 is a conceptual diagram showing the basic functionality of a query table.

FIG. 3 is a block diagram showing the basic functionality of an RVQT. The RVQT 300, source table A 320, and source table B 350 are shown. The RVQT contains bookmarks 311–318. The bookmarks are arranged into columns 301 and 302 and into rows 306–309. Table A contains rows 321–340, each of which contains data. Table B contains rows 351–360, each of which also contains data. Every row of the RVQT contains two bookmarks. One of the bookmarks in each row of the RVQT points to a row of table A, while the other bookmark in each row of the RVQT points to a row of table B. The data in the pointed-to rows of the source tables is used to provide the fields of the corresponding row of the query result. For example, if a front-end database program requested data from the third row of the query result, the engine accesses row 308 of the RVQT and use bookmarks 313 and 317 to retrieve data from rows 323 and 359, respectively, which can then be returned to the front-end database program.

In a preferred embodiment, the engine is used by a front-end database program, which interacts with the engine by calling a set of application program interface functions (APIs) provided by the engine. When the front-end calls APIs to step through the rows of the query result and retrieve query data, the engine uses a bookmark from an RVQT row (corresponding to the current row of the query, result) to access the appropriate row of the appropriate source table and retrieve the actual data for the query result. This ensures that each time the user retrieves data from the query result, the user receives current values from the source tables. Because the use of bookmarks permits the engine to quickly retrieve a field of the query result, and because the number of rows in the query result is always known to the engine (there is a one-to-one correspondence between the rows of the query result and the RVQT). The front-end database program is always able to quickly retrieve fields of the query result in a random access manner. This capability is termed scrollability.

The engine also uses the bookmarks stored in the RVQT to update fields of the source tables when the user changes the value of a field of a query result. When the user uses APIs to change the value of a field of a query result, the engine first determines whether the field depends on any updatable (described below) source tables. If so, the engine uses bookmarks from the current row of the RVQT to move to the corresponding rows of these source tables and alter the appropriate fields. In the following, a query result has a current row, which indicates the row in the query result that is currently being accessed. The RVQT also has a current row, which corresponds to the current row of the query result. Each source table also has a current row from which data is retrieved. However, as discussed below, the current row of the source tables may not always be synchronized with the current row of the query result.

Using alteration indicators associated with each row of each source table, the engine detects any changes to rows of the source tables that correspond to the current row of the query result. The engine stores an alteration indicator for each bookmark in the RVQT. When the engine detects a change, it notifies the user that data in the current row of the query result has changed. The user then has an opportunity to retrieve the fields of the current row of the query result, whose contents will reflect the change in the corresponding rows of the source tables. Also, when the user calls an API to change the contents of the field of the query result, the engine uses the alteration indicators to determine whether the corresponding field of source table has changed since the user began altering the field contents. If so, the engine warns the user that the field contents have changed and does not immediately accept the changed contents from the user.

If the user changes the value of a field of the query result upon which a table join specified by the query is based, the engine re-executes the join for the current row of the query result, by changing the bookmarks in the current row of the RVQT to refer to the newly joined-to row identified during the re-execution of the join. This process of changing the bookmarks is referred to as row fixup. Row fixup is a transitive process. If a bookmark for a source table is changed during row fixup, then bookmarks for each other source table that is joined to that source table will also need to be changed if the other source table is on a one side of the join. Also, if the engine detects that another user of a source table has updated a row in the source table that is identified by a bookmark in the RVQT, then row fixup occurs for that row in the RVQT. The engine then warns the user that data in the current row of the query result may have changed, allowing the user to re-retrieve the fields of the current row of the query result and receive field contents from the newly joined-to source table rows. Row fixup is a user option.

Figure 4:
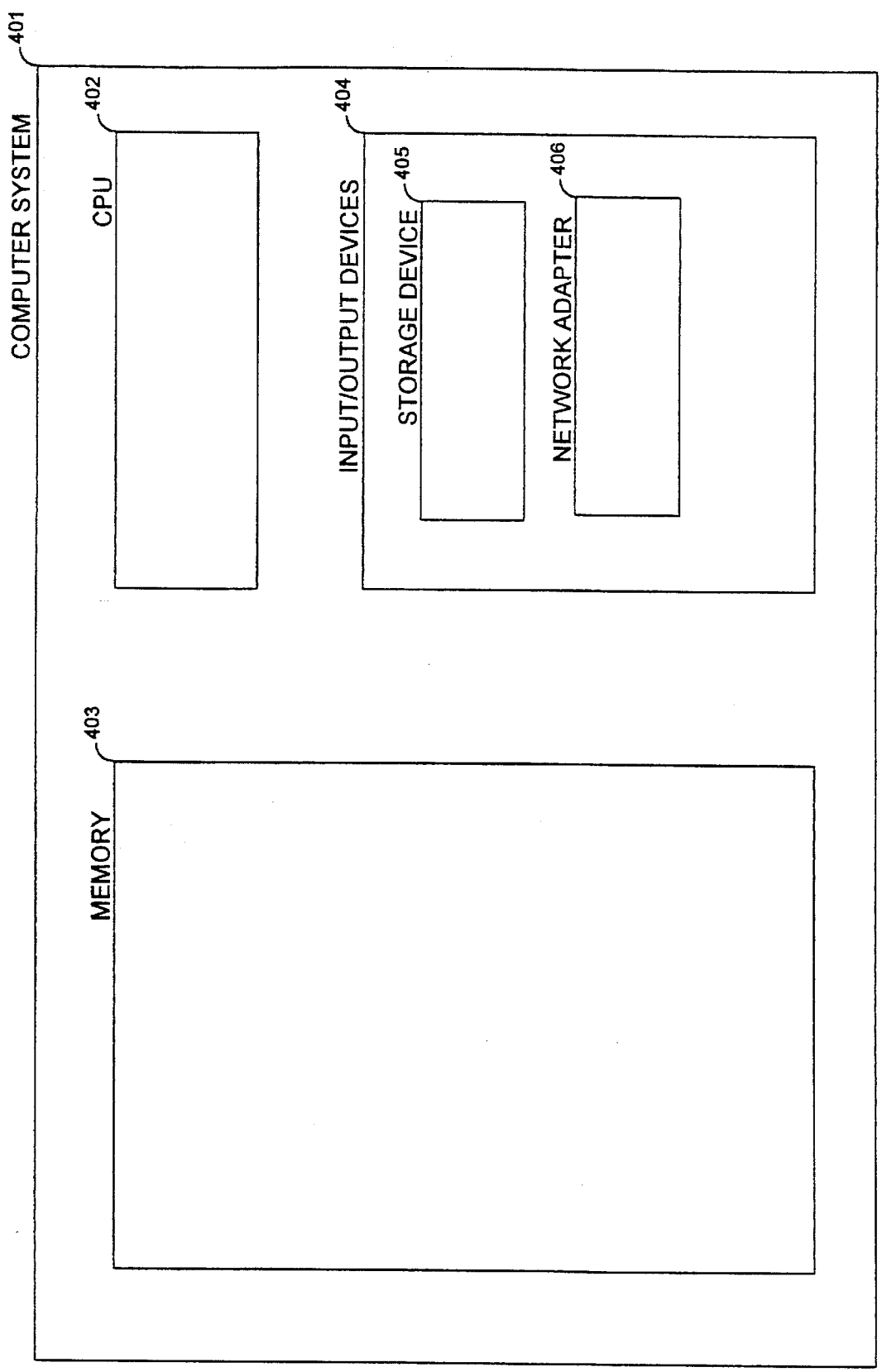
FIG. 4 is a high-level block diagram of the general purpose computer system upon which the engine preferably operates.

FIG. 4 is a high-level block diagram of the general-purpose computer system upon which the engine preferably operates. The computer system 401 contains a central processing unit (CPU) 402, a computer memory (memory) 403, and input/output devices 404. The APIs that preferably comprise the engine reside in the memory and execute on the CPU. Among the input/output devices is a storage device 405, such as a hard disk drive, upon which the engine preferably stores tables. Also among the input/output devices is a network adapter 406 for connecting to other computer systems on a network. Users of the connected computer systems may change the data in the tables stored by the engine. Also, instead of storing a particular table on a storage device of the computer system shown, the engine may store the table on a storage device of a connected computer system.

The engine supports scrollable, updatable database queries by its support of several APIs. A Query API receives the SQL text for a query, and uses it to construct an RVQT and associated data structures. A MoveForDisplay API moves the current row of the query result and begins change monitoring for that row. A Move API changes the current row of the query result without beginning change monitoring for that row. A RetrieveField API retrieves a field from the current row of the query result. This involves using bookmarks stored in the current row of the RVQT to retrieve the contents of fields of the source tables. An Update API checks for changes to the current row in preparation for updating fields of the row. A SetField API actually changes the contents of a field of the current row of the query result.

Figure 5:
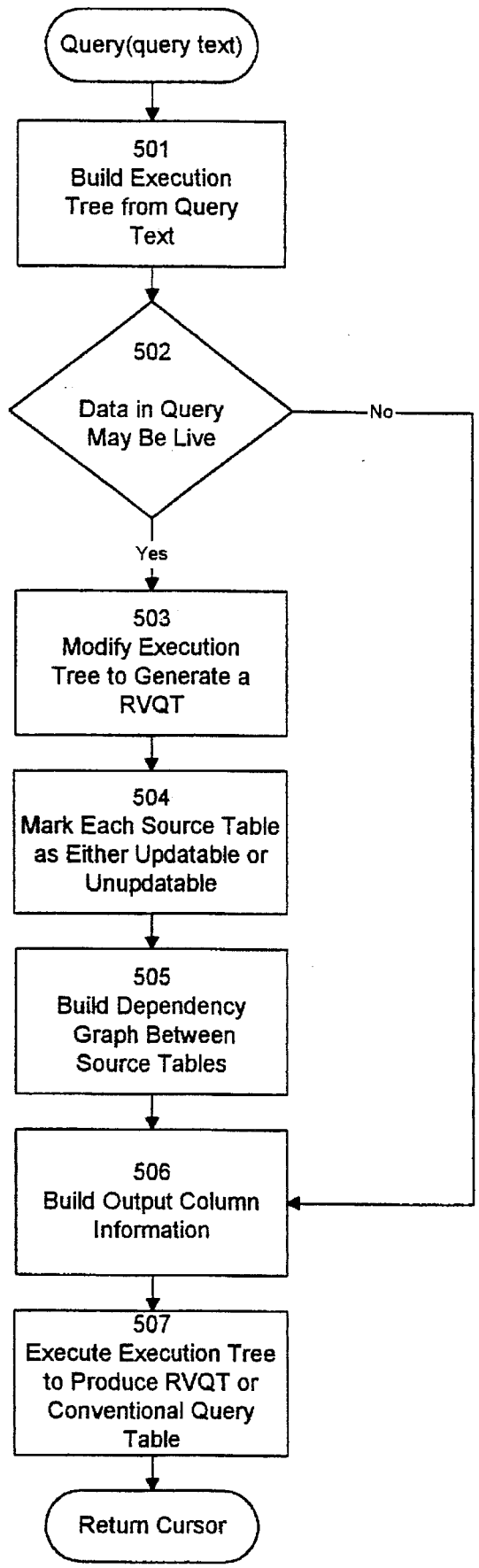
FIG. 5 is a flow diagram of the Query API.

FIG. 5 is a flow diagram of the Query API. The Query API permits the front-end to submit a query to the engine. The text of the query is a parameter of the API. In a preferred embodiment, the Query API returns a pointer to the query, also called a cursor. In object-oriented parlance, a cursor is an object through which the query results are retrieved. The cursor provides member functions to retrieve the results (e.g., get next row). The front-end then packages the pointer as an additional parameter in calls to the other APIs. This permits the front-end to submit and access several queries at the same time. In step 501, the engine builds an execution tree from the query text. This step is well known, and involves compiling the text into a tree having filter, join, and ordering nodes for representing the query in the order in which it must be executed. In object-oriented parlance, a node is an object that performs behavior such as filter or join. Each leaf node of the execution tree corresponds to a source table. Each non-leaf node corresponds to an operator (e.g., join) of the query. The execution tree combines nodes so that the root node returns the result of the query. In a preferred embodiment, each node invokes the member functions of its child node to implement its behavior.

In step 502, if the data in the query result may be live, then the engine continues in step 503 to generate an RVQT, else the engine continues at step 506 to generate a conventional query table. A query result is live if the retrieval of data returns the current data from the source table. The engine determines whether the data in the query result may be live by determining whether the engine is capable of obtaining bookmarks for the rows of each of the source tables specified by the query. In some cases where a source table can only be accessed using an external database server, the only form of bookmark the external server is capable of providing for those of the source table is a row key field. If a particular source table controlled by such an external server does not contain a key field, the external server cannot return any bookmarks for the source table. If the engine is unable to obtain bookmarks for a source table specified by the query, references to the data in that table cannot be inserted in the query table, and therefore the corresponding data in the query result cannot be live. In an alternate embodiment, the engine maintains a hybrid RVQT. A hybrid RVQT maintains bookmark where supported and actual data where bookmark is not supported. In this way, liveness is on a table-by-table basis.

In step 503, the engine modifies the execution tree to generate an RVQT, rather than a conventional query table. In step 500, the engine determines whether the query result is updatable. The query result is not updatable, if (1) The query specifies an aggregate row. Aggregate rows are those that summarize the contents of two or more rows. These include such things as the sum of values in a column, the largest value in a column, and the standard deviation of values in a column. Aggregate rows are not updatable because they do not actually occur in source tables or (2) The query specifies a distinct row. A distinct row is a row that represent duplicate rows that are omitted from the query result. Distinct rows are not updatable because they sometimes map to more than a single row of a source table.

If the query result is not updatable, then each source table is not updatable. If the query result is updatable, and row fixup is not selected, then each source table is updatable. In such case, query result may not accurately reflect the source table data. If, however, the query result is updatable, but row fixup is selected, then updatability of the source tables is determined on a table-by-table basis. If a source table is not on a one side of a one-to-many join, then the source table is updatable, else it is not updatable. Such source tables are not updatable because each row on the many side of the join would have to be checked during row fixup.

In step 505, the engine builds a dependency graph that shows the dependencies created by the query between source tables. A first source table is dependent upon a second source table if the first and second tables are joined, and each row of the first table is joined to at most one row of the second table. For example, the Employees table is dependent upon the Managers table.

In step 506, the engine builds output column information. For each output column specified by the query, the engine specifies how it is to be derived. It can simply be a particular column of a particular source table, or it can be a more complicated expression involving two or more source table columns, joined by various operators. In step 507, the engine executes the execution tree to produce the RVQT or conventional query table. The conventional query table can be accessed using conventional techniques. The RVQT is accessed in accordance with the techniques described below.

Figure 6:
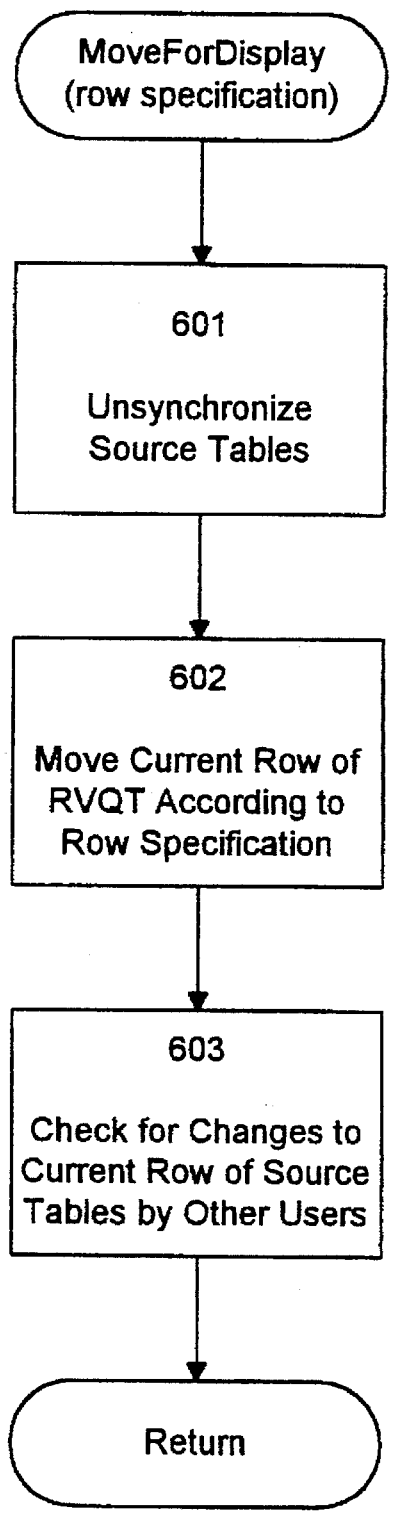
FIG. 6 is a flow diagram of the MoveForDisplay API.

FIG. 6 is a flow diagram of the MoveForDisplay API. The front-end calls the MoveForDisplay API in order to move to a new current row of the query result when the front-end plans to retrieve data for display. The API accepts as a parameter a specification of the row to which the front-end wants to move. This can either be a relative row specification (e.g., "forward three rows" or "back five rows"), or an absolute row specification (e.g., "first row"). In step 601, the engine indicates that the source table current row numbers are unsynchronized with the query result current row number. The engine maintains a synchronization flag that indicates whether each source table is currently positioned at the bookmark specified by the RVQT current row. The query result current row can be positioned independently of the current row of the source tables. However, the current row of the source tables must be synchronized with the RVQT current row before the actual data in the source table is accessed. This is an optimization designed B limit unnecessary movements within the source tables which can consume significant resources. The source tables are resynchronized when the front-end calls the RetrieveField API to retrieve data or the SetField API to change data. In step 602, the engine moves the query result current row according to the row specification parameter value. In step 603, the engine checks for changes to the current row of each source table by other users. Step 603 is described in more detail in conjunction with FIG. 11 below. The engine then returns.

Figure 7:
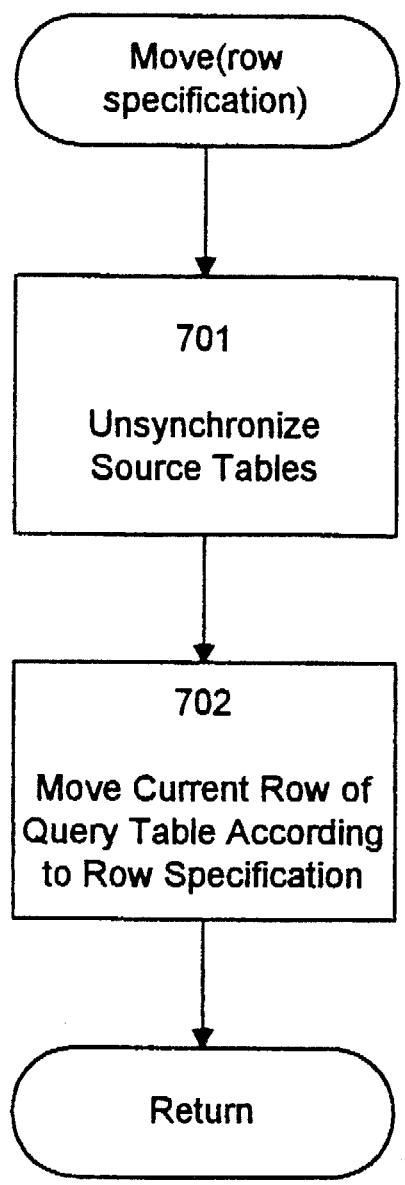
FIG. 7 is a flow diagram of the Move API.

FIG. 7 is a flow diagram of the Move API. The front-end calls the Move API in order to move to a different row of the query result where it does not intend to retrieve and display data. Step 701 and 702 are identical to steps 601 and 602, respectively. As an optimization, here the engine does not perform the step of checking for changes to the current row of each source table. After executing step 702, the engine returns.

Figure 8:
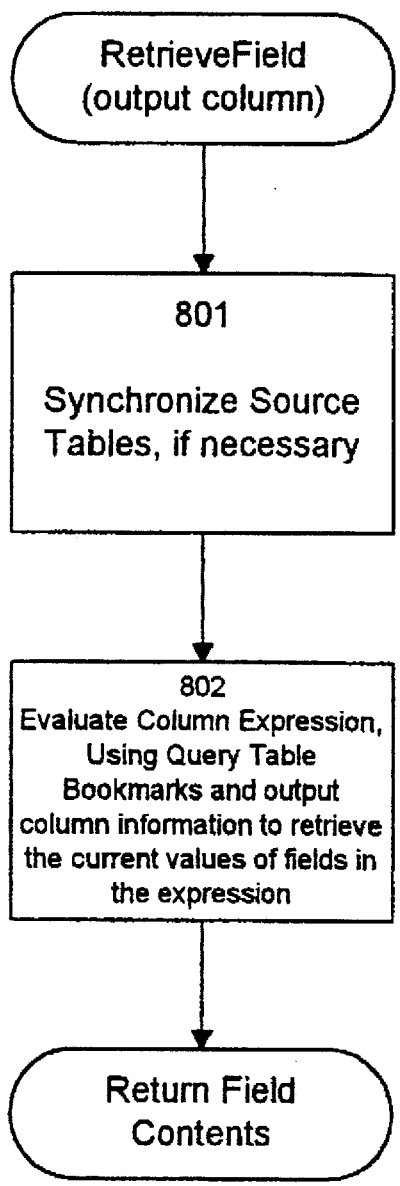
FIG. 8 is a flow diagram of the RetrieveField API.

FIG. 8 is a flow diagram of the RetrieveField API. The front-end calls the RetrieveField API in order to retrieve the contents of a field of the query result. The API receives a parameter an output column of the query result. The RetrieveField API actually retrieves the contents of one or more fields from the source tables and uses the contents to form the contents of the query result field in accordance with the current row, the RVQT, and the output column information generated in step 506. In step 801, the engine synchronizes the current row of each of the source tables with the current row of the query result, if necessary. That is, using the bookmarks in the current row of the RVQT, the current row of each source table is moved to correspond to the bookmark. In step 802, the engine evaluates the column expression corresponding to the output column parameter value. The engine uses the RVQT bookmarks and output column information to retrieve the current values of the fields in the expression. The engine then applies any operators in the expression to form the field contents. The engine then returns that final value as the contents of the specified field of the query result.

Figure 9:
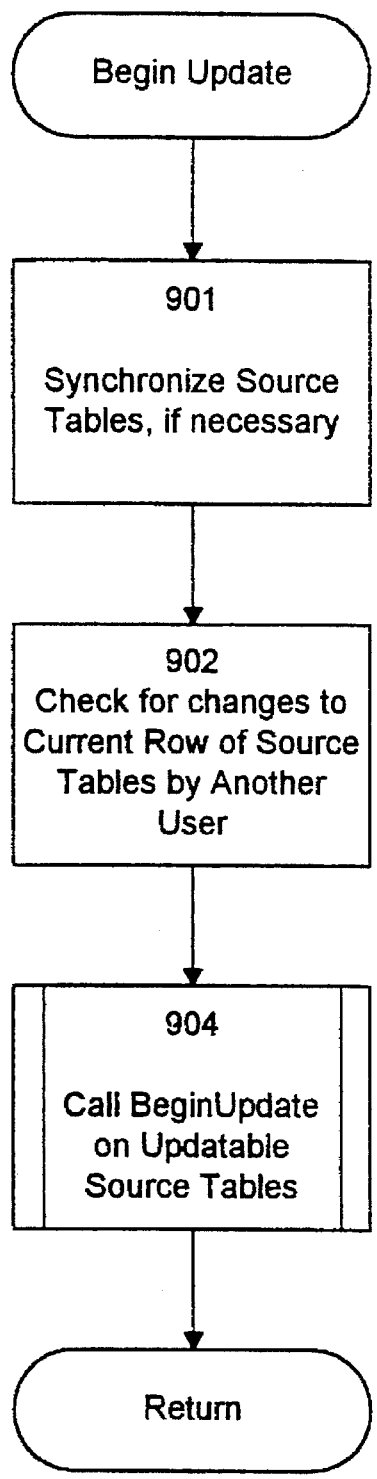
FIG. 9 is a flow diagram of the Update API.

FIG. 9 is a flow diagram of the BeginUpdate API. The front-end calls the Update API in order to inform the engine the front-end will soon call the SetField API to change the contents of one or more query result fields. At the completion of the update, the front-end invokes either the EndUpdate API to commit the changes or the CancelUpdate to cancel the changes. In step 901, the engine synchronizes the current row of each source table with the current row of the query result, if necessary. In step 902, the engine checks for changes to the current row of each source table by another user. More detail on step 902 is given below in FIG. 11. In step 904, the engine calls the lower-level update function to do any necessary source table access locking. The engine then returns. When a begin update is indicated, the engine saves a copy of the current row in the RVQT. All updates are reflected in the RVQT. If, however, the update is canceled, the current row of the RVQT is restored to the copy. In this way, the front-end see the effects of uncommitted updates.

Figure 10:
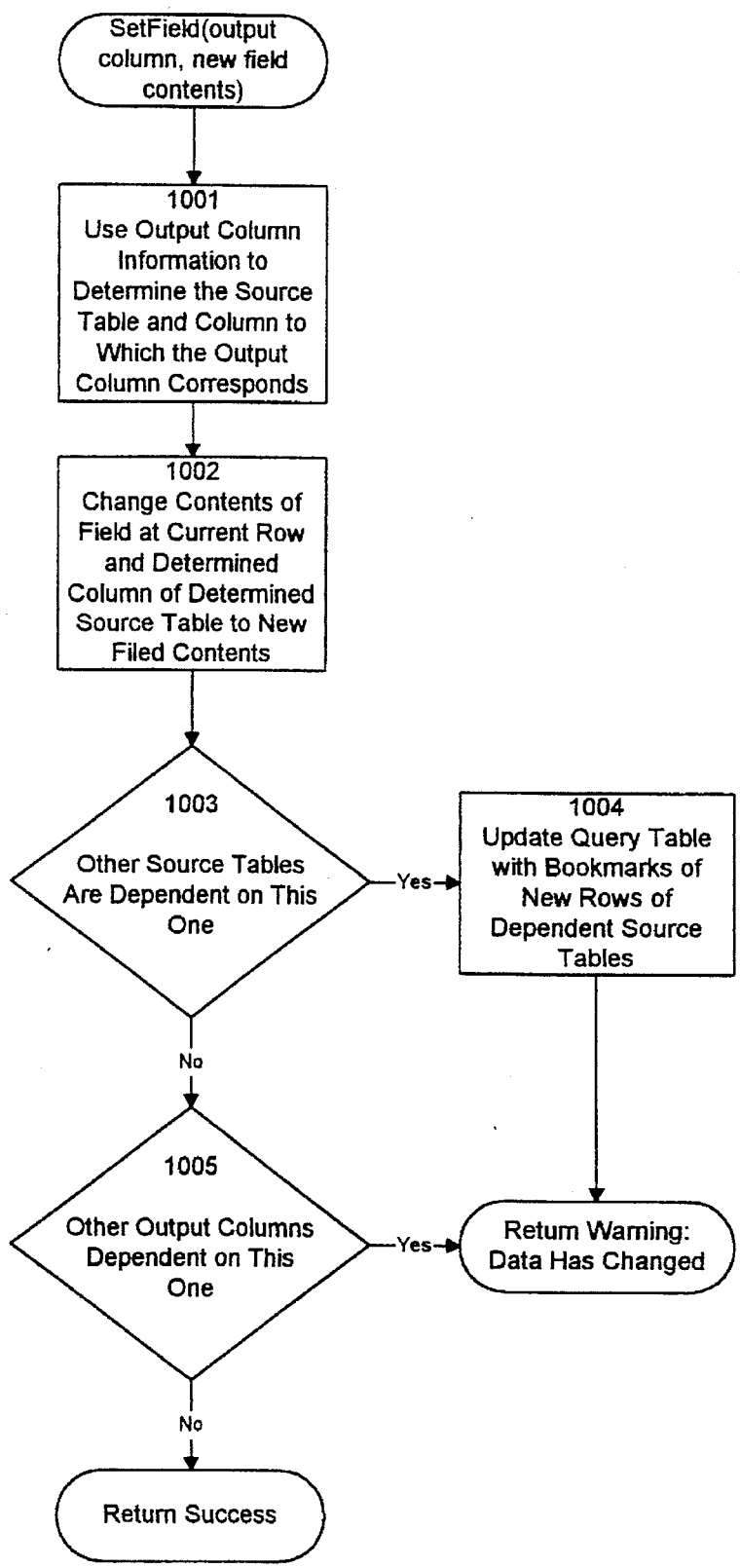
FIG. 10 is a flow diagram of the SetField API.

FIG. 10 is a flow diagram of the SetField API. The front-end calls the SetField API in order to change the contents of a particular field of the query result. This API has parameters for the output column to change and the new contents for that field. In step 1001, the engine uses the RVQT output column information to determine the source table and column to which the output column parameter value corresponds. In step 1002, the engine changes the contents of the field at the current row and the determined column of the determined source table to the value of the new field contents parameter (if the source table is updatable). In step 1003, if other source tables are dependent on the determined source table, then the engine continues its step 1004, else the engine continues with step 1005. The engine determines whether any other source tables are directly or indirectly dependent upon the determined source table with reference to the dependency graph generated by step 505 of the Query API.

In step 1004, the engine updates the RVQT with the bookmarks of any new rows of dependent source tables that are specified by the updated field. For example, if a manager is changed in the query result of FIG. 2, then the bookmark into the Managers table needs to be changed to identify the new manager. if the Manager table were in turn joined to another table, then this fixing up would continue. The engine then returns a warning that data in the current row of the query result has changed. This warning gives the front-end an opportunity to retrieve the contents of the other fields of the current row of the query result and obtain the changed data.

In step 1005, if other columns of the query result are dependent on the determined column, then the engine returns a warning that the data has changed, else the engine returns success. Another column is dependent upon the determined column if other column is derived from the determined column.

Figure 11:
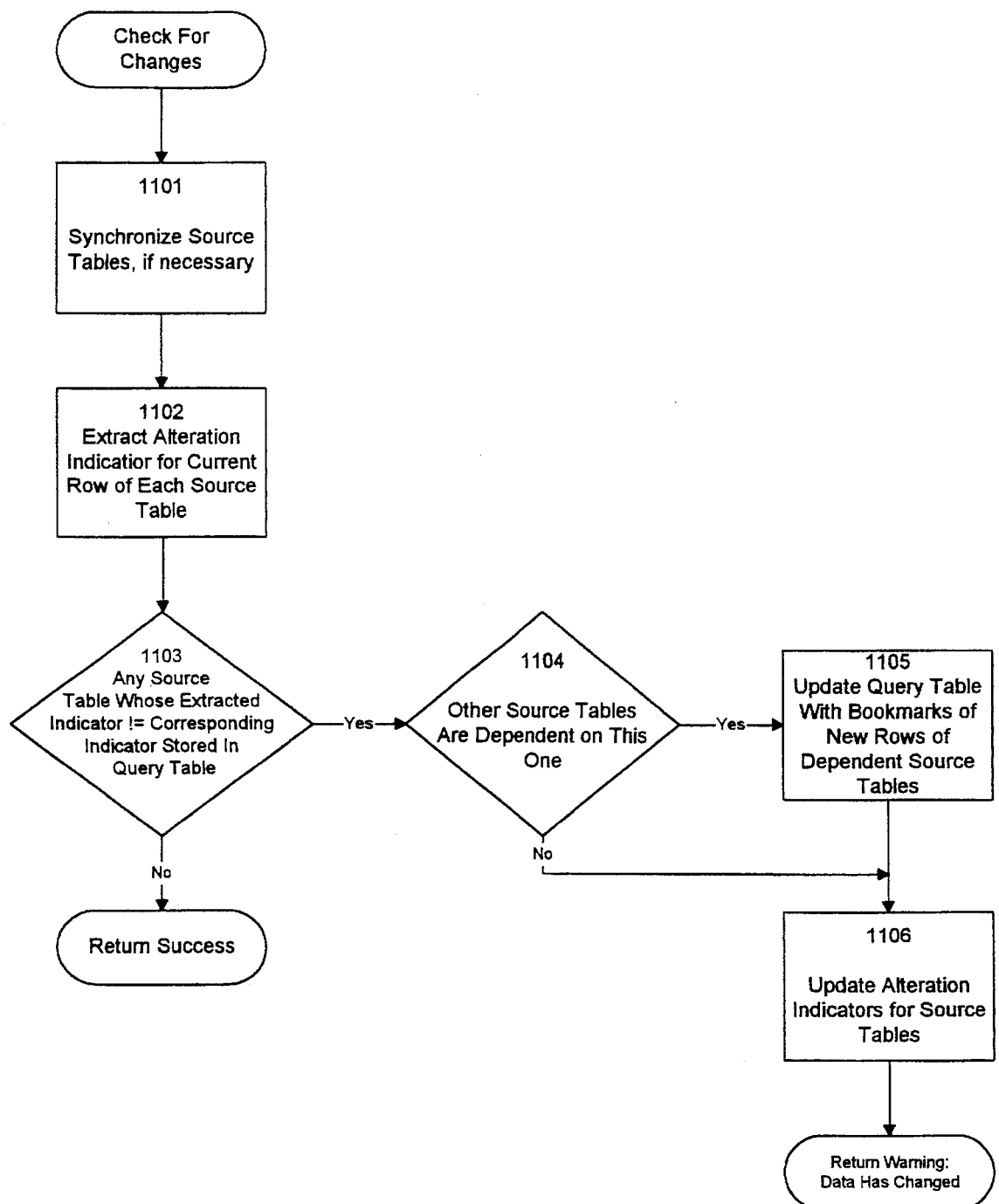
FIG. 11 is a flow diagram providing more detail on steps 503 and 802.

FIG. 11 is a flow diagram providing more detail of steps 603 and 902. In steps 1101–1106, the engine checks for changes to the current row of each source table by other users. In step 1101, the engine synchronizes the current row of each source table with the current row of the query result, if necessary. In step 1102, the engine retrieves the alteration indicator for the current row of each source table. In a preferred embodiment, a last update timestamp is stored for each row of each source table, and the update timestamp is used as an alteration indicator. In an alternate embodiment, the engine generates a checksum for the current row of each source table, based on the contents of the entire row, which it uses as an alteration indicator. In this embodiment, the checksum must be regenerated each time the row is "retrieved."

In step 1103, if there is a source table whose retrieved alteration indicator is not equal to the corresponding alteration indicator stored for that row in the RVQT, then the engine continues at step 1104, else the engine returns success. In step 1104, if other source tables are dependent on a source table whose retrieved alteration indicator is not equal to the corresponding alteration indicator stored in the query result, then the engine continues at step 1105, else the engine returns a warning that data in the current row of the query result has changed. The warning permits the front-end to retrieve the contents of the other fields in the current row of the query result. The condition of step 1104 is determined with reference to the dependency graph generated by the step 405 of the Query API. In step 1105, the engine updates the RVQT with bookmarks of the corresponding new rows of the dependent source tables. This is referred to as exogenous fixup as it results from updates by other users. In step 1106, the engine updates the alteration indicators stored in the current row of the RVQT for the source tables with the alteration indicator values retrieved in step 1102. The engine then returns a warning that data in the current row of the query result has changed. The engine returns a special warning if a row has been deleted.

Figure 12:
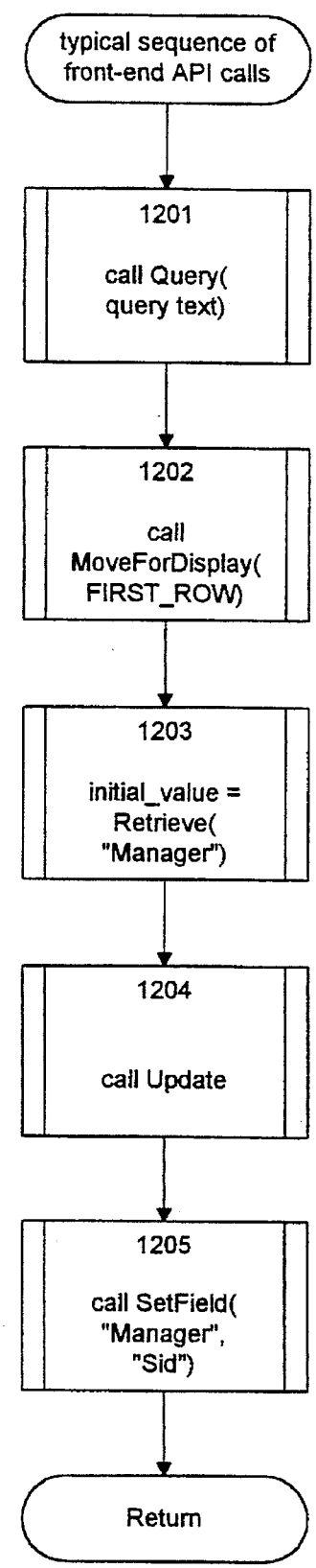
FIG. 12 is a flow diagram of a typical sequence of front-end API calls.

In order to demonstrate the functioning of the engine, its use by the front-end to process, retrieve, and update a query is described. FIG. 12 is a flow diagram of the sequence of API calls that the front-end makes in order to process, retrieve, and update the query shown in Table 1. In step 1201, the front-end calls the Query API in order to submit the query. The front-end passes in the text of Table 1 as the query text parameter. In the Query API, the engine builds an execution tree from the query text and determines that the query result may contain live data. The engine further builds a dependency graph that shows the Employees table to be dependent on the Managers table, since the Employees table is on the many side of a many-to-one join.

The engine also builds output column derivation information for the query result. FIG. 13 is a diagram of the output column derivation for this query. The output column derivation table 1300 has rows 1301–1303, one for each output column of the query. Each row of the output column derivation table shows the output column's name and the output column's derivation. For example, row 1301 shows that the derivation for the "Name" output column is "Employee.Name," or the Name column of the Employee table. One skilled in the art would appreciate that the derivation for an output column can be a significantly more complicated expression, applying one or more operators to different colas of several source tables.

Finally, the engine executes the query's execution tree to produce the RVQT. FIG. 14 is a table diagram of the RVQT produced by the engine. The RVQT 1400 has 21 rows, each of which corresponds to a row of the Employees table whose CompensationType field contains "salary." The RVQT has four columns: an Employees bookmark column 1431, a Managers bookmark column 1432, an Employees alteration indicator column 1433, and a Managers alteration indicator column 1434. The fields in the Employees bookmark column each contain a bookmark that uniquely identifies a row of the Employees table. For instance, in row 1401, the Employees bookmark field uniquely identifies row 101 of the Employees table. The fields in the Managers bookmark column each contain a bookmark that uniquely identifies the row of the Managers table that has the same Manager column contents as the row of the Employees table whose bookmark is contained in the Employees bookmark field of that row of the RVQT. For example, in row 1401, the Managers bookmark field uniquely identifies row 158 of the Managers table. Finally, the Employees alteration indicator column and the Managers alteration indicator column for a given row contain an alteration indicator for indicating the alteration of the identified rows of the Employees and Mangers tables, respectively.

In step 1202, the front-end calls the MoveForDisplay API to move to the first row of the query result and to inform the engine that the front-end plans to retrieve and display the contents of fields in the first row of the query result. Here the engine checks for changes to the current row of each source table by other users by retrieving the current values of the alteration indicators and comparing the retrieved values to those stored in alteration indicator columns of the RVQT. In this case, the two versions of the alteration indicators are identical, and processing continues.

In step 1203, the engine calls the Retrieve API to retrieve the contents of the Manager output column of the query result. The engine first synchronizes the current row of each source table with the current row of the query result by seeking the row of each source table specified by the appropriate bookmark. For instance, the engine seeks in the Employees table using the "Name='Andrea'" bookmark stored in the Employees bookmark field of RVQT row 1401, making row 101 the current row of the Employees table. The engine then evaluates the column derivation expression for the Manager output column of the query result appearing in row 1302 of the output column derivation table—"Employees.Manager". The engine then retrieves and returns the contents of the Manager field of the current row of the Employees table, which is "Rose". The front-end stores the value retrieved.

In step 1204, the front-end calls the BeginUpdate API to inform the engine that the front-end is about to change field values in the current row of the query result. The engine first synchronizes the source tables with the query result. The engine checks for changes to the current row of each source table by other users by retrieving the current values of the alteration indicators and comparing the retrieved values to those stored in alteration indicator columns of the RVQT. In this case, the two versions of the alteration indicators are identical, and processing continues. Finally, the engine calls the lower-level update function to do any necessary source table access locking.

In step 1205, the front-end calls the SetField API to change the contents of the Manager output column of the query result to "Sid". The engine evaluates the column derivation expression for the Manager output column of the query result appearing in row 1302 of the output column derivation table—"Employees.Manager". The engine then stores "Sid" in the Manager field of the current row of the Employees table. Afterwards, the engine checks the dependency graph to determine whether this source table depends on other source tables. Since the graph indicates that the Employees table is dependent of the Managers table, the engine re-executes the join between the Employees table and the Managers table with respect to the current row of the Employees table. Since the Manager field value "Sid" maps to row 159 of the Managers table, the engine updates the Managers bookmark of the current value of the RVQT with the bookmark for row 159 of the Managers table. FIG. 14B is a table diagram of the RVQT after the SetField API is called. The front-end then returns a warning that data in the current row of the query result has changed. The front-end may then proceed to retrieve the contents of the other fields in the current row of the query result. When it does so, the field contents returned will be those for row 101 of the Employees table and row 159 of the Managers table. That is: Name="Andrea", Manager="Sid", DepartmentNumber="2".

In a preferred embodiment of the present invention, a row can be inserted into a query result. A BeginInsert API and an EndInsert API are used to begin and commit an insert. Inserted rows logically appear at the end of the query result. Also, a row can be deleted from a query result. The Delete API removes the current row from the query result and the underlying source table rows for updatable source tables.

While this invention has been shown and described with reference to preferred embodiments, it will be understood by those skilled in the art that various changes or modifications in form and detail may be made without departing from the scope of the invention.

We claim:

1. A computer-readable medium containing instructions for causing a computer system to retrieve data from a database having a source table, the source table having rows with data, by:

receiving a query request that identifies a subset of rows of the source table;

generating a query result table containing references to rows of the source table that are identified by the received query request;

receiving a retrieve request to retrieve data from a specified source table row identified by the received query request;

retrieving from the query result table the reference to the specified source table row; and retrieving the data from the specified source table row using the retrieved reference to locate the specified source table row.

2. The computer-readable medium of claim 1, further including:

after receiving the retrieve request, receiving a second retrieve request to retrieve data from a second specified source table row identified by the received query request;

retrieving from the query result table the reference to the second specified source table row; and retrieving the data from the second specified source table row using the retrieved reference to locate the second specified source table row.

3. The computer-readable medium of claim 1 further including:

receiving an instruction to store update data in a second specified source table row;

retrieving from the query result table the reference to the second specified source table row; and storing the update data into the second specified source table row using the retrieved reference to locate the second specified source table row.

4. A method in a computer system for displaying data retrieved from a source table in a database, the source table having rows with data, the computer system having a front-end program and a database engine, the method comprising:

under control of the front-end program, receiving from a user a query request to retrieve rows of data from the database, the query request indicating a criterion that the data of the retrieved rows is to satisfy; and sending the received query request to the database engine;

under control of the database engine, receiving the sent query request;

identifying those rows of the source table with data that satisfies the criterion of the received query request; and for each identified row, storing in a row of a query result table a reference to the identified row; and for each of a plurality of retrieve requests to retrieve data that satisfies the criterion of the query request, under control of the front-end program, receiving the retrieve request from a user; and sending the received retrieve request to the database engine;

under control of the database engine, receiving the sent retrieve request;

in response to receiving the sent retrieve request, retrieving, from a row of the query result table, the stored reference to an identified row of the source table;

using the retrieved reference to retrieve from the source table the data of the identified row; and sending the retrieved data to the front-end program; and under control of the front-end program, receiving the sent data; and displaying the received data.

5. A method in a database engine of a computer system for supplying to a computer program records from a database, each record having data and a record identifier, the method comprising:

receiving from the computer program a query request with a selection criterion for selecting records that satisfy the selection criterion;

selecting the records of the database that satisfy the selection criterion;

storing the record identifiers of each selected record;

receiving from the computer program a plurality of retrieve requests to retrieve data from the records that satisfy the selection criterion; and for each received retrieve request,
  selecting a stored record identifier;
  retrieving the record from the database that is identified by the selected record identifier; and
  sending to the computer program the retrieved record.

6. The method of claim 5 including after storing the record identifiers, updating data of a selected record wherein the sending of the retrieved record sends the updated data.

7. The method of claim 5 wherein the records are stored as rows of a source table of the database.

8. The method of claim 5 wherein the storing of the record identifiers stores the record identifiers in rows of a query result table.

9. The method of claim 5 wherein the computer program is a front-end database program that displays the sent records.

10. A method in a computer system for propagating changes to data contained in records of a database from the database to a display of the data, the display generated by a front-end display program, the method comprising:

receiving from the front-end display program a query request that identifies records of the database;

generating a query result table containing references to records of the database that are identified by the received query request;

receiving a retrieve request from the front-end display program to retrieve data from a specified record identified by the received query request;

retrieving from the query result table the reference to the specified record;

retrieving the specified record from the database using the retrieved reference to locate the specified record in the database;

determining whether the data of the specified record has been changed since the specified record was last accessed by the front-end display program; and when it is determined that the data of the specified record has changed, notifying the front-end display program that the data in the specified record has been changed so that the front-end display program can update the display.

11. The method of claim 10 wherein the determining of whether the specified record has been changed includes:

fetching a current record version indicator indicating a current state of the specified record; and comparing the fetched current record version indicator to a record version indicator indicating the state of the specified record at the time it was last accessed.

12. The method of claim 11 wherein the fetching of a current record version indicator includes the fetching of a current record timestamp indicating a time at which the specified record was last changed, and wherein the comparing of the fetched current record version indicator to a last-fetched record version indicator includes comparing the fetched current record timestamp to a last-fetched record timestamp indicating the time at which the specified record was last accessed.

13. The method of claim 11 wherein the fetching of a current record version indicator includes the fetching of a current record checksum that encodes the data currently stored in the specified record, and wherein the comparing of the fetched current record version indicator to a last-fetched record version indicator includes comparing the fetched current record checksum to a last-fetched record checksum that encodes the data retrieved from the specified record when retrieving.

14. The method of claim 11 wherein the fetching of a current record version indicator includes the fetching of a current record version number indicating the number of times the specified record has been modified since a counter initialization time, and wherein the comparing of the fetched current record version indicator to a last-fetched record version indicator includes the step of comparing the fetched current record version number to a last-fetched record version number indicating the number of times the specified record had been modified between the counter initialization time and the time at which the retrieving was performed.

15. The method of claim 11 wherein upon receiving the notification, the front-end display program displays to a user a warning indicating that data associated with the specified record has changed.

16. The method of claim 11 wherein the changed data from the specified record is provided to the front-end display program at the same time that the front-end display program is notified that the data in the specified record has changed.

17. The method of claim 16 wherein the step of providing the changed data from the specified record includes re-retrieving the specified record using a reference from the query result table.

18. The method of claim 17 wherein the query specifies an expression for deriving data to be returned to the requesting program from data stored in the specified record, further including using the expression specified by the query to derive the data to be returned to the requesting program from the data in the specified record retrieved by the re-retrieving.

19. The method of claim 10 wherein the changed data from the specified record is provided to the front-end display program at the same time that the front-end display program is notified that the data in the specified record has changed.

20. The method of claim 10 wherein upon receiving the notification, the front-end display program displays to a user a warning indicating that data associated with the specified record has changed.

21. The method of claim 10 further comprising:

receiving a request from the front-end display program to retrieve the changed data of the specified record; and in response to receiving the request, retrieving the changed data from the specified record and sending the retrieved data to the front-end display program so that changes to the data can be propagated to the display.

22. An apparatus for providing a current version of a subset of the data contained in a database having a source table, the source table having rows with data, the subset of the data specified by execution of a database query, execution of the database query identifying source table rows and generating a query result table, the query result table comprised of rows containing references to the identified source table rows, the apparatus comprising:

a source table memory for storing the contents of the source table;

a query memory for storing the query result table; and a query contents retrieval engine for, in response to a request to retrieve data from the subset of data contained in the identified source table rows, specifying a row of the query result table, reading the reference from the row of the query result table, and using the read reference to retrieve and provide at least a portion of the referenced source table row.

23. The apparatus of claim 22 wherein the database is comprised of a plurality of source tables.

24. The apparatus of claim 23 wherein each row of the query result table contains a plurality of references to source table rows identified from among the plurality of source tables and the query retrieval engine retrieves at least a portion of each referenced source table row contained in the specified query result table row.

25. A method in a computer system for retrieving data from a database having a plurality of source tables, the source tables having rows with data, the method comprising:

receiving a query request that identifies a subset of source table rows from among the plurality of source tables;

generating a query result table containing references to source table rows that are identified by the received query request;

receiving a retrieve request to retrieve data from specified source table rows identified by the received query request;

retrieving from the query result table the references to the specified source table rows from among the plurality of source tables; and retrieving the data from the specified source table rows using the retrieved references to locate the specified source table rows from among the plurality of source tables.

26. The method of claim 25, further including:

after receiving the retrieve request, receiving a second retrieve request to retrieve data from a second specified source table row identified by the received query request;

retrieving from the query result table the reference to the second specified source table row; and retrieving the data from the second specified source table row using the retrieved reference to locate the second specified source table row from among the plurality of source tables.

27. The method of claim 26 further including the steps of:

receiving an instruction to store update data in a second specified source table row;

retrieving from the query result table the reference to the specified source table row; and storing the update data into the second specified source table row using the retrieved reference to locate the second specified source table rows from among the plurality of source tables.

28. A computer-readable medium containing instructions for causing a computer system to propagate changes to data contained in database source table rows from the source table rows to a display of the data, the display generated by a front-end display program, by:

receiving a query request that identifies a subset of rows of the source table;

generating a query result table containing references to rows of the source table that are identified by the received query request;

receiving a retrieve request from the front-end display program to retrieve data from a specified source table row identified by the received query request;

retrieving from the query result table the reference to the specified source table row;

retrieving the specified source table row using the retrieved reference to locate the specified source table row;

determining whether the data of the specified source table row has been changed since the specified source table row was last accessed by the front-end display program; and when it is determined that the data of the specified source row table has changed, notifying the front-end display program that the data in the specified source table row has been changed so that the front-end display program can update the display.

29. The computer-readable medium of claim 28 wherein the determining is performed in response to receiving an instruction to specify a source table row for retrieval.

30. The computer-readable medium of claim 28 wherein determining whether the specified source table row has been changed includes:

fetching a current row version indicator indicating a current state of the specified source table row; and comparing the fetched current row version indicator to a row version indicator indicating the state of the specified source table row at the time it was last accessed.

31. The computer-readable medium of claim 30 wherein the fetching of a current row version indicator includes fetching a current row timestamp indicating a time at which the specified source table row was last changed, and wherein the comparing of the fetched current row version indicator to a last-fetched row version indicator includes comparing the fetched current row timestamp to a last-fetched row timestamp indicating the time at which the specified source table row was last accessed.

32. The computer-readable medium of claim 30 wherein the fetching of a current row version indicator includes fetching a current row checksum that encodes the data currently stored in the specified source table row, and wherein the comparing of the fetched current row version indicator to a last-fetched row version indicator includes comparing the fetched current row checksum to a last-fetched row checksum that encodes the data retrieved from the specified source table row in the retrieving step.

33. The computer-readable medium of claim 30 wherein the fetching of a current row version indicator includes fetching a current row version number indicating the number of times the specified source table row has been modified since a counter initialization time, and wherein the comparing of the fetched current row version indicator to a last-fetched row version indicator includes comparing the fetched current row version number to a last-fetched row version number indicating the number of times the specified source table row had been modified between the counter initialization time and the time at which the retrieving step was performed.

34. The computer-readable medium of claim 28 wherein upon receiving the notification, the front-end display program displays to a user a warning indicating that data associated with the specified source table row has changed.

35. The computer-readable medium of claim 28 wherein the changed data from the specified source table row is provided to the front-end display program at the same time that the front-end display program is notified that the data in the specified source table row has changed.

36. The computer-readable medium of claim 35 wherein the providing of the changed data from the specified source table row includes re-retrieving the specified source table row using a reference from the query result table.

37. The computer-readable medium of claim 36 wherein the query specifies an expression for deriving data to be returned to the requesting program from data stored in the specified source table row, further including using the expression specified by the query to derive the data to be returned to the requesting program from the data in the specified source table row retrieved by the re-retrieving.

38. The computer-readable medium of claim 36 wherein the previously executed query specified that a relationship exists between data stored in a source table row referred to by a first reference contained in the query result table and data stored in a second source table row referred to by a second reference contained the query result table and wherein the relationship between the data referred to by the first reference and the data referred to by the second reference no longer exists because of changes to the data stored in at least one of the referenced source table rows, the computer-readable medium further including:
 locating a different source table row containing data with which data from the source table row referred to by the first reference currently bears the specified relationship;
 replacing the second reference with a reference to the located source table row; and
 returning to the program requesting retrieval the data contained in the located source table row.

39. The computer-readable medium of claim 38, further including retrieving the located row using the reference with which the second reference was replaced in the replacing.

40. The computer-readable medium of claim 38 wherein the query further query further specifies that a second relationship exists between data stored in the source table row referred to by the second reference contained in the query result table and data stored in a third source table row referred to by a third reference contained in the query result table and wherein the relationship between the data referred to by the second reference and the data referred to by the third reference no longer exists at the time of the retrieving step because of changes to the data stored in at least one of the referenced source table rows referred to by the second reference and the third reference, the computer-readable medium further including:
 locating a second different source table row containing data with which data from the source table row referred to by the second reference currently bears the second specified relationship;
 replacing the third reference in the query result table with a reference to the second located source table row; and
 returning to the program requesting retrieval the data contained in the second located source table row.

41. A database engine of a computer system for supplying to a computer program records from a database, each record having data and a record identifier, comprising:
 means for receiving from the computer program a query request with a selection criterion for selecting records that satisfy the selection criterion;
 means for selecting the records of the database that satisfy the selection criterion;
 means for storing the record identifiers of each selected record;
 means for receiving from the computer program a plurality of retrieve requests to retrieve data from the records that satisfy the selection criterion; and
 means for each received retrieve request,
  selecting a stored record identifier;
  retrieving the record from the database that is identified by the selected record identifier; and
  sending to the computer program the retrieved record.

42. The database engine of claim 4 including
 means for updating data of a selected record wherein the sending of the retrieved record sends the updated data after storing the record identifiers.

43. The database engine of claim 4 wherein the records are stored as rows of a source table of the database.

44. The database engine of claim 4 wherein the means for storing the record identifiers stores the record identifiers in rows of a query result table.

45. The database engine of claim 4 wherein the computer program is a front-end database program that displays the sent records.

* * * * *